(12) United States Patent
Defazio et al.

(10) Patent No.: US 9,348,320 B1
(45) Date of Patent: May 24, 2016

(54) ELECTRONIC DEVICE AND METHOD OF CONTROLLING DISPLAY OF INFORMATION

(71) Applicant: BlackBerry Limited, Waterloo (CA)

(72) Inventors: Michael Joseph Defazio, Fonthill (CA); Steven Henry Fyke, Waterloo (CA); Donald Somerset McCulloch McKenzie, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/607,895

(22) Filed: Jan. 28, 2015

(51) Int. Cl.
  *G04G 11/00* (2006.01)
  *G04G 5/04* (2006.01)
(52) U.S. Cl.
  CPC . *G04G 5/04* (2013.01); *G04G 11/00* (2013.01)
(58) Field of Classification Search
  CPC ......... G04G 21/04; G04G 11/00; G04G 5/04; G04B 47/00
  See application file for complete search history.

(56) References Cited

U.S. PATENT DOCUMENTS

| | | | | |
|---|---|---|---|---|
| 5,329,501 A | * | 7/1994 | Meister | G04G 21/04 340/7.53 |
| 5,528,559 A | * | 6/1996 | Lucas | G04B 47/00 368/10 |
| 7,948,830 B2 | * | 5/2011 | Suzuki | B63C 11/02 368/11 |
| 8,323,114 B2 | | 12/2012 | Burak et al. | |
| 2003/0165086 A1 | | 9/2003 | Brewer et al. | |
| 2015/0185707 A1 | * | 7/2015 | Liou | G04G 21/08 368/47 |

* cited by examiner

*Primary Examiner* — Sean Kayes
(74) *Attorney, Agent, or Firm* — Borden Ladner Gervais LLP; Geoffrey deKleine

(57) ABSTRACT

A method of controlling a first electronic device having a display includes, in a time mode, controlling analog watch hands disposed over the display to display a time on a watch dial that includes the display, and in response to receipt of an input to enter a display mode, rotating the watch hands to new locations relative to the display such that display of the time utilizing the watch hands is discontinued and displaying information on the display, wherein rotating the watch hands comprises rotating the hands to the new locations to avoid obscuring the information on the display.

18 Claims, 7 Drawing Sheets

ELECTRONIC DEVICE AND METHOD OF CONTROLLING DISPLAY OF INFORMATION

FIELD OF TECHNOLOGY

The present disclosure relates to electronic devices including, but not limited to, portable electronic devices and controlling the display of information.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), laptop computers with wireless 802.11 or Bluetooth® capabilities, and peripheral devices for communicating with smart phones.

Portable electronic devices such as PDAs or smart telephones are generally intended for handheld use and ease of portability. Peripheral devices are gaining popularity and are may be utilized as a secondary display to display information thereon. With increasing popularity of such peripheral devices in communication with smart phones, improvements in the display information on such devices are desirable.

BRIEF DESCRIPTION OF THE DRAWINGS

Embodiments of the present disclosure will now be described, by way of example only, with reference to the attached figures, in which.

DETAILED DESCRIPTION

Figure 1:
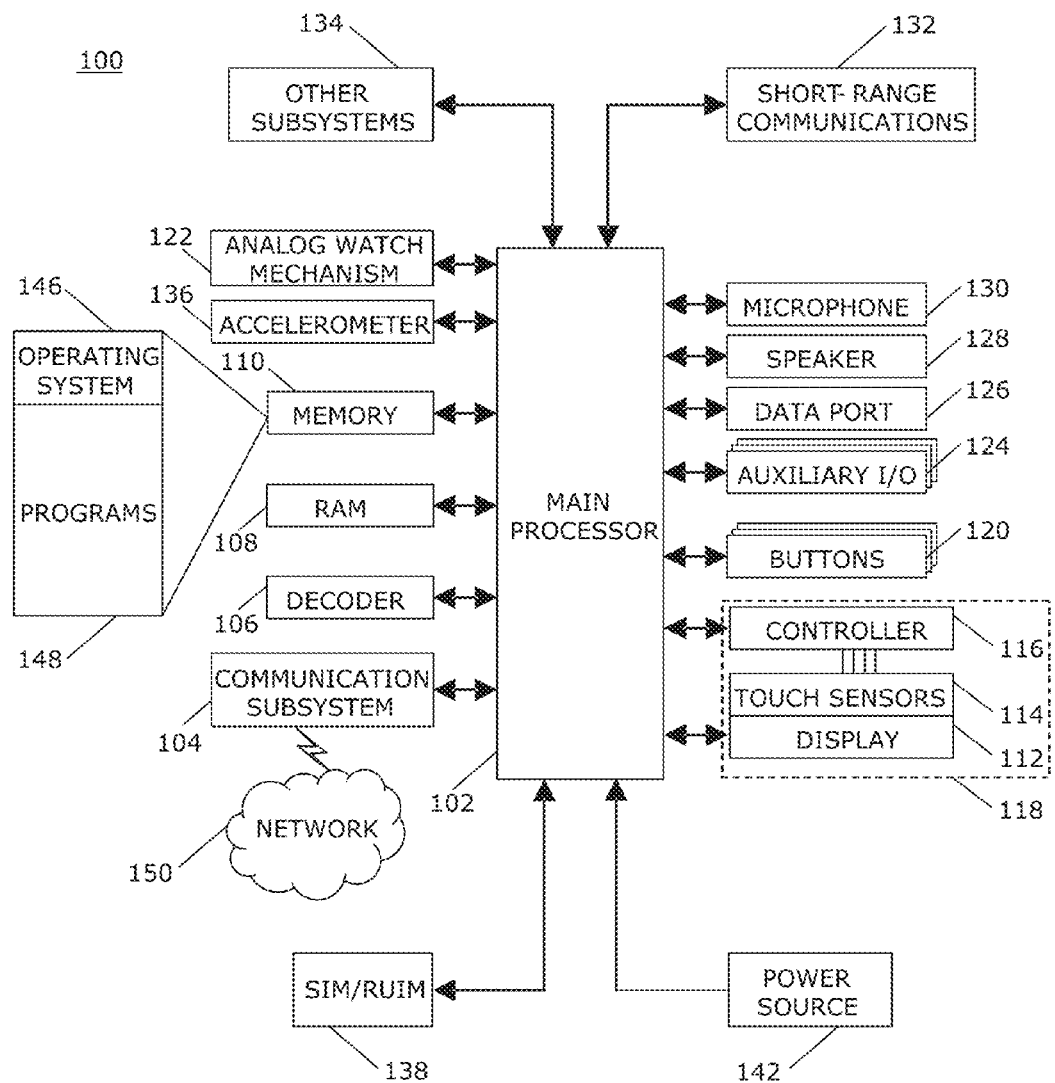
FIG. 1 is a block diagram of an example of a portable electronic device in accordance with the disclosure.

The following describes an electronic device and a method of controlling the electronic device. The method includes, in a time mode, controlling analog watch hands disposed over the display to display a time on a watch dial that includes the display, and in response to receipt of an input to enter a display mode, rotating the watch hands to new locations relative to the display such that display of the time utilizing the watch hands is discontinued and displaying information on the display, wherein rotating the watch hands comprises rotating the hands to the new locations to avoid obscuring the information on the display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, tablet computers, mobile internet devices, electronic navigation devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A battery 142, such as one or more rechargeable batteries, powers the electronic device 100.

The processor 102 interacts with other components, such as a Random Access Memory (RAM) 108, memory 110, a touch-sensitive display 118, buttons 120, an auxiliary input/output (I/O) subsystem 124, a data port 126, a speaker 128, a microphone 130, short-range communications 132 and other device subsystems 134.

The touch-sensitive display 118 includes a display 112 and touch sensors 114 that are coupled to at least one controller 116 that is utilized to interact with the processor 102. Input via a graphical user interface is provided via the touch-sensitive display 118 and the buttons 120. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, one or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The portable electronic device 100 in the present application also includes an analog watch mechanism 122 that controls watch hands of the portable electronic device 100 to display a current time. The analog watch mechanism 122 is coupled to and controlled by the processor 102 to display the time, utilizing the watch hands, when the portable electronic device 100 is in a time mode and to move to locations, for example, to segment the touch-sensitive display 118 when the portable electronic device 100 is in a display mode.

Figure 2:
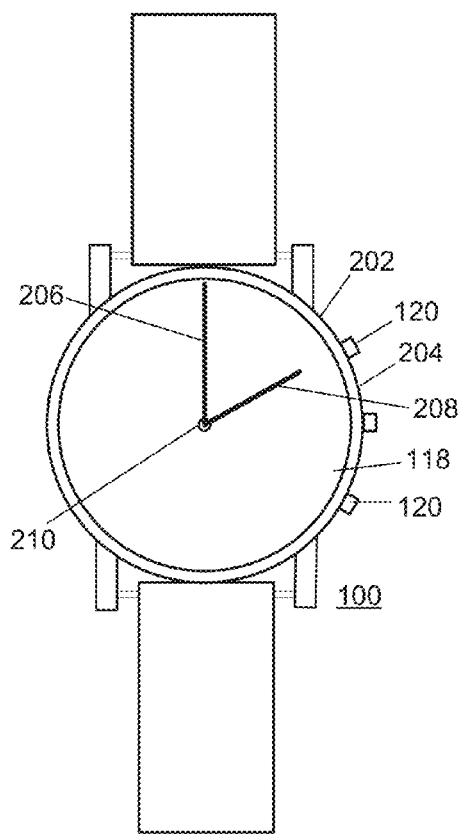
FIG. 2 is a front view of an example of a portable electronic device in a time mode in accordance with the disclosure.
Figure 3:
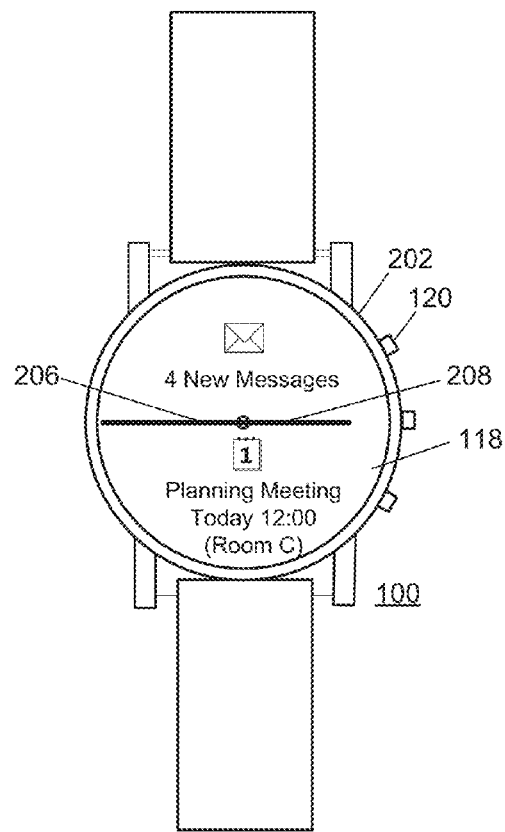
FIG. 3 is a front view of an example of a portable electronic device in a display mode in accordance with the disclosure.

A front view of an example of a portable electronic device 100 in a time mode is shown in FIG. 2 and a front view of the example of the portable electronic device 100 in a display mode is shown in FIG. 3. In the present embodiment, the portable electronic device is in the shape of a watch and is worn at or near the wrist of a user. The portable electronic device 100 includes a housing 202 that houses the internal components shown and described above with reference to FIG. 1. The housing 202 includes a frame 204 and a back, joined by sidewalls that extend between the frame 204 and the back. The housing 202 may be made of any suitable material such as, for example, metal or a high density plastic. The frame 204 frames the touch-sensitive display 118.

In the example shown in FIG. 2 and FIG. 3, three buttons 120 extend from the sidewall, although any suitable number of buttons may be utilized. Alternatively, the portable electronic device 100 may be without such buttons.

The analog watch mechanism 122 shown in FIG. 1 is disposed below the touch-sensitive display 118, between the touch-sensitive display 118 and the back of the portable electronic device 118 and is therefore not visible in the front views shown in FIG. 2 and FIG. 3. The analog watch mechanism is coupled to the watch hands 206, 208 via an aperture 210 in the touch-sensitive display 118. Thus, a portion of the analog watch mechanism 122 extends through the aperture 210 in the touch-sensitive display 118 and the watch hands are coupled to the portion of the analog watch mechanism 122 to control the movement of the watch hands 206, 208. In the present example, the watch hands 206, 208 include a minute hand 206 and an hour hand 208. The front of the portable electronic device 100, including the touch-sensitive display 100 acts as a watch dial with the watch hands 206, 208 to display the time when the portable electronic device 100 is in the time mode.

As indicated above, the portable electronic device 100 is operable in a time mode in which the watch hands 206, 208 display the time on the watch dial, as illustrated in the example of FIG. 2. In the time mode, the display 112 of the touch-sensitive display 118 may be turned off or may operate at reduced power. Thus, the display 112 may be turned off or powered down such that information is not displayed when the portable electronic device 100 is in the time mode. Alternatively, the display 112 may be utilized to display a background when the portable electronic device 100 is in the time mode. The touch sensors 114 of the touch-sensitive display 118 may be utilized to detect touches when the portable electronic device 100 is in the time mode. Alternatively, the touch sensors 114 may be turned off or powered down such that touches on the touch-sensitive display 118 are not detectable when the portable electronic device 100 is in the time mode. By turning off or powering down the touch-sensitive display 118, power consumption may be reduced when the portable electronic device 100 is in the time mode.

The portable electronic device 100 is also operable in a display mode, as illustrated in the example of FIG. 3. When in the display mode, the watch hands 206, 208 are not utilized to display the time. Instead, the watch hands 206, 208 are moved to locations at which information is not displayed. Thus, the display of information is not obscured by the watch hands 206, 208. The watch hands may segment the touch-sensitive display 118 to divide the display into segments in which information is displayed. The information displayed on the touch-sensitive display 118 may be information from an application executed by the processor 102 of the portable electronic device 100. For example, the information may be information related to a media player, a message application or applications, a calendaring application, an address book or contacts application, or any other suitable application. Each segment may be utilized to display information from a different application or may be utilized to display different information from the same application. In the example shown in FIG. 3, the watch hands 206, 208 extend generally in a straight line to segment the display into two parts. For the purpose of the present example, the upper segment in the orientation illustrated in FIG. 3 is utilized to indicate a number of new messages in a messaging application. The lower segment is utilized to indicate a next calendar event from a calendaring application. Other information may be displayed on the touch-sensitive display 118.

Figure 4:
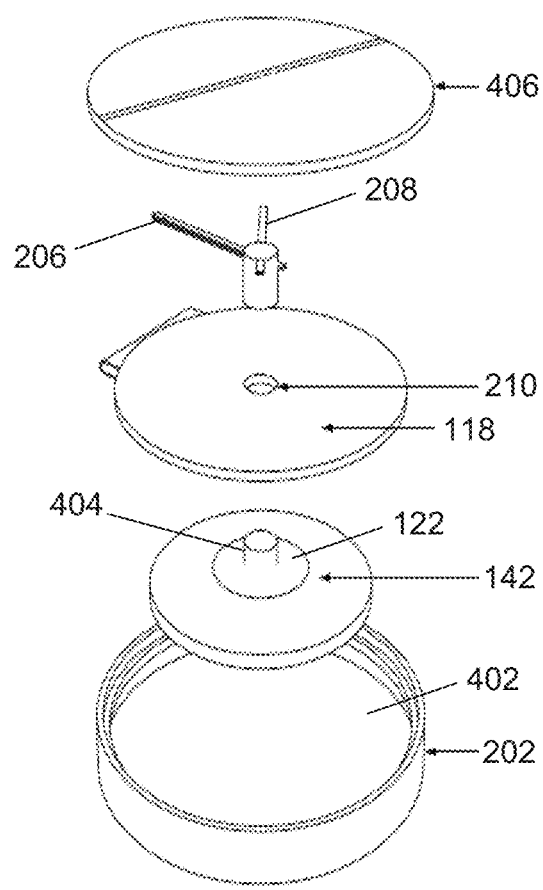
FIG. 4 is a simplified exploded perspective view illustrating parts of the portable electronic device in accordance with the disclosure.

Reference is made to FIG. 4, which shows an exploded perspective view of parts of the portable electronic device 100. As described above, the analog watch mechanism 122 is disposed between the back 402 of the housing 202 and the touch-sensitive display 118. The battery 142 and a printed circuit board are also disposed between the touch-sensitive display 118 and the back 402 of the housing 202 such that the analog watch mechanism 122, the battery 142 and the printed circuit board are not visible when viewing the watch from the front. A portion 404 of the analog watch mechanism 122 extends through the aperture in the touch-sensitive display 118 and the watch hands 206, 208 are coupled to the portion 404 of the analog watch mechanism 122. A cover glass 406 covers the watch hands 206, 208 and the touch-sensitive display 118 and engages with the frame 204 to provide an enclosure.

Figure 5:
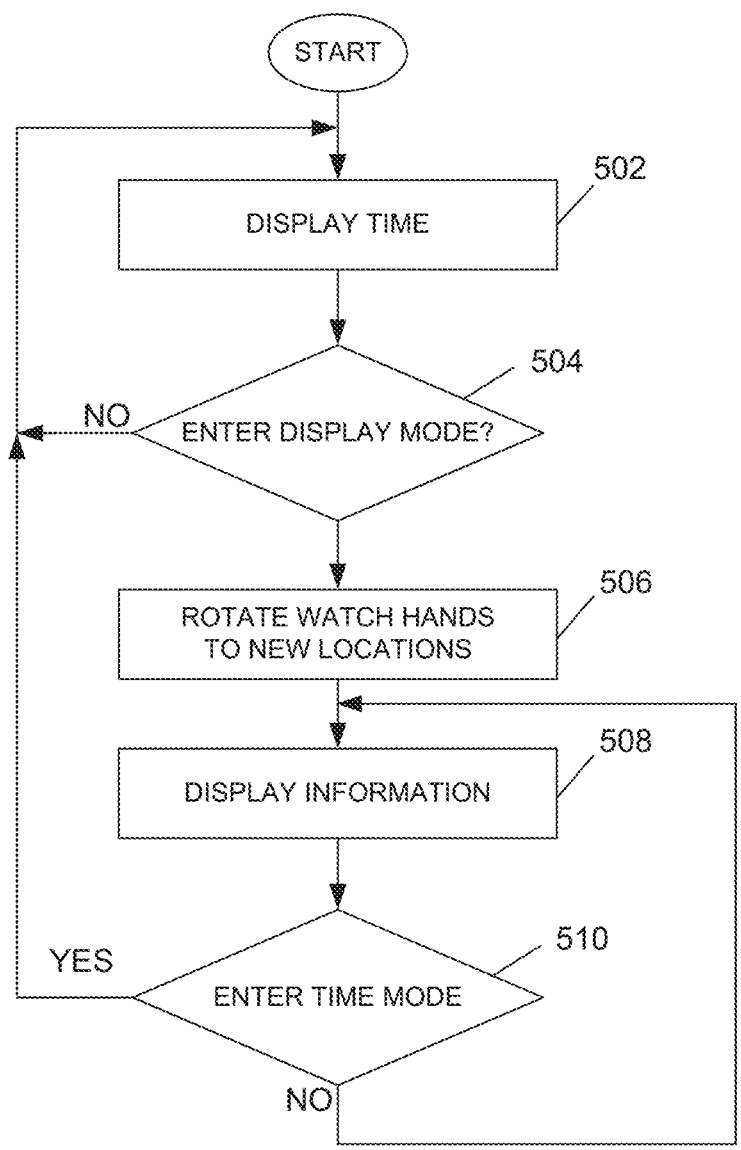
FIG. 5 is a flowchart illustrating a controlling the display of information on the portable electronic device of FIG. 1 in accordance with the disclosure.

A flowchart illustrating a method of controlling an electronic device is shown in FIG. 5. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the electronic device to perform the method may be stored in a computer-readable storage medium, such as a non-transitory computer-readable medium.

The portable electronic device 100 is in a time mode at 502 in which the time is displayed on the watch dial, which includes the touch-sensitive display 118, utilizing the watch hands 206, 208, as illustrated in the example of FIG. 2.

When no input to enter the display mode is received at 504, the process continues at 502 and the portable electronic device 100 remains in the time mode.

In response to receipt of an input to enter the display mode at 504, the process continues at 506. The input to enter the display mode at 504 may be a communication received at the portable electronic device 100, such as, receipt of an email message or other message at the portable electronic device, receipt of a phone call, receipt of a calendar invitation, or any other suitable communication received. Alternatively, the input to enter the display mode at 504 may be a user input to the portable electronic device 100, such as a tap detected by the touch-sensitive display 118 or the accelerometer 136, depression of one or more of the buttons 120, or any other touch or gesture on the touch-sensitive display 118.

At 506, the watch hands 206, 208 are rotated relative to the touch-sensitive display 118 such that display of the time by the watch hands 206, 208 is discontinued. The watch hands 206, 208 are moved to locations at which they do not obscure the information displayed on the touch-sensitive display 118 and the information is displayed on the touch-sensitive display 508. The watch hands 206, 208 divide the touch-sensitive display 118 into at least two segments in which the information is displayed, as illustrated in the example of FIG. 3.

A determination is made whether to return to the time mode at 510. The portable electronic device 100 may automatically return to the time mode after a predetermined period of time. For example, after displaying information on the touch-sensitive display 118 for 1 minute, the portable electronic device 100 may return to the time mode and display the time utilizing the watch hands 206, 208. Alternatively, the portable electronic device 100 may return to the time mode in response to passage of threshold period of time without detecting an input such as an input on the touch-sensitive display. Optionally, the portable electronic device 100 may return to the time mode in response to an input by the user, such as a tap detected by the touch-sensitive display 118 or the accelerometer 136, depression of one or more of the buttons 120, or any other touch or gesture on the touch-sensitive display 118.

Figure 6:
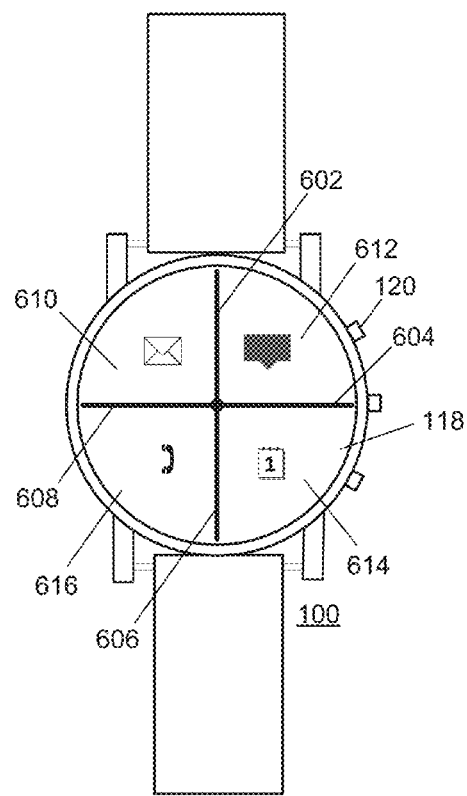
FIG. 6 and FIG. 7 illustrate examples of displayed content and control of the portable electronic device in accordance with the disclosure.
Figure 7:
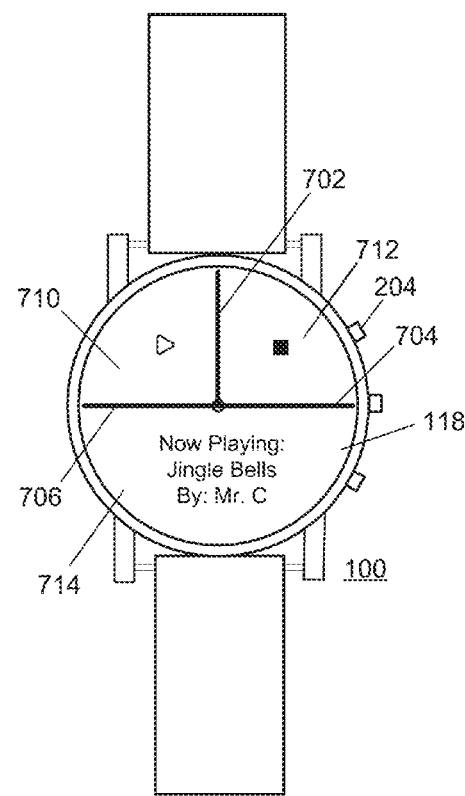

Examples of displayed content and control of the portable electronic device 100 are illustrated in FIG. 6 and FIG. 7. In these examples, the portable electronic device 100 includes watch hands that are stacked when the portable electronic device 100 is in the time mode. For example, two, three, four, or more hands may be stacked on the minute hand and the stacked hands are spread apart to divide the display into three or more segments when in the display mode.

Referring to FIG. 6, for example, four watch hands 602, 604, 606, 608 are aligned such that the watch hands are stacked together as the minute hand 206 shown in FIG. 2 when the portable electronic device 100 is in the time mode at 502. In response to receipt of the input to enter the display mode at 504, the hands are rotated at 506 to different locations such that the hands are spread apart and divide the touch-sensitive display 118 into four segments 610, 612, 614, 616. For the purpose of the present example, the four minute hands 602, 604, 606, 608 are directed to the 12:00, 3:00, 6:00, and 9:00 positions such that the segments are quadrants of the touch-sensitive display 118. The hour hand 208 is aligned with one of the minute hands 602, 604, 606, 608 such that the one of the minute hands is stacked on top of the hour hand 208. For the purpose of the present example, each segment displays information relating to a different application. Information relating to received email is displayed in the upper left segment 610, information relating to received text messages is displayed in the upper right segment 612, information relating to calendar events is displayed in the lower right segment 614, and information relating to received phone calls is displayed in the lower left segment 616.

Optionally, a user may select one of the segments or the information displayed in the segment to launch an associated application or to display associated information. For example, a touch on the email icon in the upper left segment 610 may launch the email application to display emails. Similarly, a touch on the text message icon in the upper right segment 612 may launch the text message application to display text messages, a touch on the calendar icon in the lower right segment 614 may launch the calendar application to display calendar events, or a period of time that may include calendar events, and a touch on the phone icon in the lower left segment 616 may launch the phone application to display sent or received or both sent and received calls, or to display a keypad, for example to make a call.

In the example of FIG. 7, three watch hands 702, 704, 706 are aligned such that the watch hands are stacked together as the minute hand 206 shown in FIG. 2 when the portable electronic device 100 is in the time mode at 502. In response to receipt of the input to enter the display mode at 504, the hands are rotated at 506 to different locations such that the hands are spread apart and divide the touch-sensitive display 118 into three segments 710, 712, 714. For the purpose of the present example, the three minute hands 702, 704, 706, 608 are directed to the 12:00, 3:00, and 9:00 positions such that the segments are not equivalent in size. The hour hand 208 is aligned with one of the minute hands 702, 704, 706 such that the one of the minute hands is stacked on top of the hour hand 208. For the purpose of the present example, each segment displays information relating to a media player application. A selectable play button is displayed in the upper left segment 710, a selectable stop button in displayed in the upper right segment 712, and information relating to music playing utilizing the media application is displayed in the lower segment 714. Optionally, a user may select one of the segments or the information displayed in the segment to perform an associated action. For example, a user may select the play button displayed in the upper left segment 710 to play a selected song. The user may also select the stop button to stop the song. The information relating to the music playing may be selected, for example, to view more information relating to the music or to view a list of music available for playing.

In the above-described examples, the portable electronic device 100 is a PDA and includes features and functions of a handheld electronic communication device. In another example embodiment, the portable electronic device may function without a display. For example, the device may not have any display or, alternatively, may include an analog watch face and components of an analog watch. In alternative examples, the portable electronic device may include more or fewer functions and features.

Figure 8:
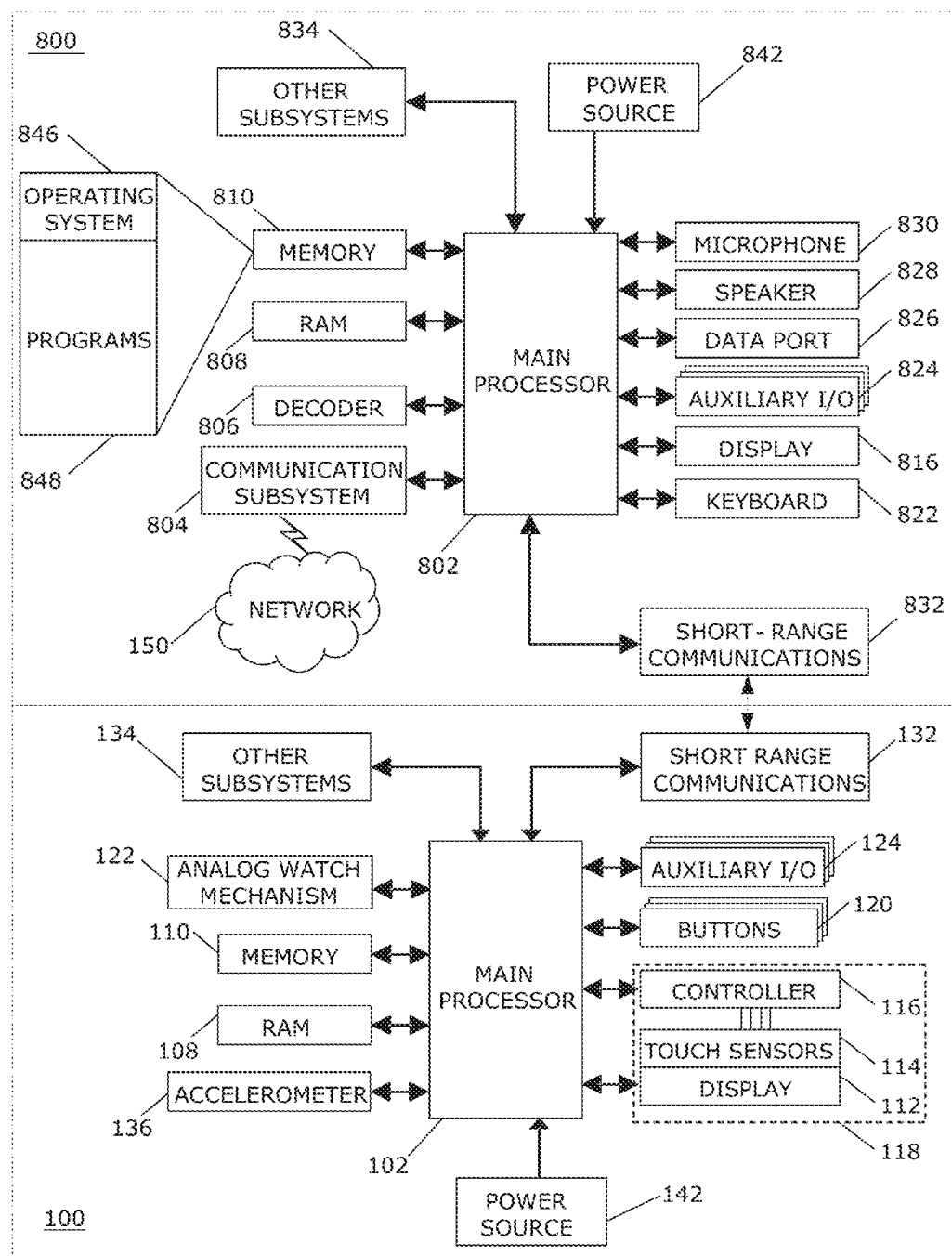
FIG. 8 is a simplified block diagram of components of a portable electronic device in short-range communication with a second electronic device, according to one example.

Alternatively, the portable electronic device may include short-range communication capabilities for communicating with a handheld electronic communication device or second electronic device but other communication capabilities may be absent from the device. Reference is made to FIG. 8 to describe an example of a portable electronic device that communicates, for example, with a handheld electronic communication device. Similar reference numerals are used herein to describe similar features of the portable electronic device. In this example, the portable electronic device 100 may include many of the features of the portable electronic device 100 shown in FIG. 1. In the present example, however, the portable electronic device includes short-range communications 132, for example, for communicating with the handheld electronic communication device 800 but does not include a communication subsystem, for example. Features such as the microphone, speaker, data port, and other features may also be absent from the portable electronic device 100. Instead, the portable electronic device 100 communicates wirelessly, such as through Bluetooth™ communication with a second electronic device such as the handheld electronic communication device 800. Thus, the portable electronic device in the present example may act as a peripheral device that communicates with the handheld electronic communication device 800 and provides signals, including information stored at the handheld electronic communication device 800, to the portable electronic device.

The portable electronic device 100, which may be in the form of, for example, a watch, includes multiple components such as a processor 102 that controls the operations of the portable electronic device 100. Data communications are performed through the short-range communications 132. The portable electronic device 100 is a battery-powered device and includes a power source 142 such as a rechargeable battery or batteries.

The processor 102 also interacts with additional subsystems such as a Random Access Memory (RAM) 108, memory 110, buttons 120, an accelerometer 136, a touch-sensitive optional display 118, an actuator 120, an auxiliary input/output (I/O) subsystem 124, and other device subsystems 134. User interaction with the graphical user interface of the portable electronic device 100 may be performed through the buttons 112 and the touch-sensitive display 118. The processor 102 also interacts with the analog watch mechanism 122 to control the movement of the hands of the portable electronic device 100.

As indicated, the portable electronic device 100 may communicate with the handheld electronic communication device 800 which includes many of the features of the portable electronic device 100. In the present example, the handheld electronic communication device 800 may perform communication functions, including data and voice communications which are performed through a communication subsystem 804. Data received by the portable electronic device 800 may be decompressed and decrypted by a decoder 806. The communication subsystem 804 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a power source 842 such as a rechargeable battery or batteries.

The processor 802 of the handheld communication device 800 also interacts with additional subsystems such as a Random Access Memory (RAM) 808, memory 810, a keyboard 822, a display 816, an auxiliary input/output (I/O) subsystem 824, a data port 826, a speaker 828, a microphone 830, short-range communications 832 and other device subsystems 834. The short-range communications 832 are utilized to communicate with the portable electronic device 100, which in the present example is a peripheral device.

Information such as a text message, an e-mail message, or web page download is processed by the communication subsystem 804 and input to the processor 802. The processor 802 then processes the received signal for output to the display 812. Information may also be sent from the handheld electronic communication device 800 to the portable electronic device 100 and signals or data may be received at the handheld electronic communication device 800 from the portable electronic device 100.

Communication between the handheld electronic communication device 800 and the portable electronic device 100 may be initiated in any suitable manner. For example, communication may be initiated by selection of an option to search for peripheral devices utilizing the handheld electronic communication device 800 when the portable electronic device 100 is within suitable range for operation of the short-range communications. Communication may also be initiated by selection of an option to listen for peripheral devices, for example. Alternatively, or in addition, communication may be initiated via the portable electronic device 100.

Referring again to FIG. 5, the portable electronic device 100 is in a time mode at 502. The time is displayed on the watch dial, which includes the touch-sensitive display 118, utilizing the watch hands 206, 208 as illustrated in the example of FIG. 2.

When no input to enter the display mode is received at 504, the process continues at 502 and the portable electronic device 100 remains in the time mode.

In response to receipt of an input to enter the display mode at 504, the process continues at 506. The input to enter the display mode at 504 may be a communication received from the handheld electronic communication device 800, such as, receipt of a signal when an email message or other message is received at the handheld electronic communication device 800, or when a phone call, a calendar invitation, or any other suitable communication is received at the handheld electronic communication device 800. The input to enter the display mode at 504 may be a communication received at the portable electronic device 100 from the handheld electronic communication device 800 when the user interacts with the handheld electronic communication device 800, for example, when a media application is launched at the handheld electronic communication device 800. Alternatively, the input to enter the display mode at 504 may be a user input to the portable electronic device 100, such as a tap detected by the touch-sensitive display 118 or the accelerometer 136, depression of one or more of the buttons 120, or any other touch or gesture on the touch-sensitive display 118.

At 506, the watch hands 206, 208 are rotated relative to the touch-sensitive display 118 such that display of the time by the watch hands 206, 208 is discontinued. The watch hands 206, 208 are moved to locations at which they do not obscure the information displayed on the touch-sensitive display 118 and the information is displayed on the touch-sensitive display at 508. The watch hands 206, 208 divide the touch-sensitive display 118 into at least two segments in which the information is displayed. The information displayed may be information received from the handheld electronic communication device 800. For example, the handheld electronic communication device 800 may transmit information relating to any suitable application for display on the touch-sensitive display 118 of the portable electronic device 100.

A determination is made whether to return to the time mode at 510. The portable electronic device 100 may automatically return to the time mode after a predetermined period of time. For example, after displaying information on the touch-sensitive display 118 for 1 minute, the portable electronic device 100 may return to the time mode and display the time utilizing the watch hands 206, 208. Alternatively, the portable electronic device 100 may return to the time mode in response to passage of threshold period of time without detecting an input such as an input on the touch-sensitive display. Optionally, the portable electronic device 100 may return to the time mode in response to an input by the user, such as a tap detected by the touch-sensitive display 118 or the accelerometer 136, depression of one or more of the buttons 120, or any other touch or gesture on the touch-sensitive display 118.

Figure 9:
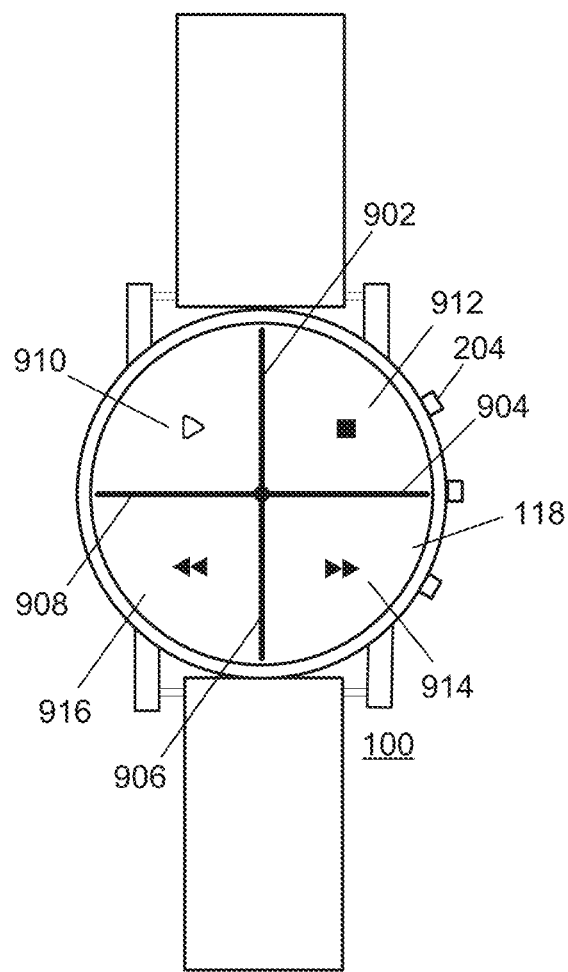
FIG. 9 illustrates an example of displayed content and control of the portable electronic device in accordance with the disclosure.

An example of displayed content and control of the portable electronic device 100 is illustrated in FIG. 9. In this example, the portable electronic device 100 includes watch hands that are stacked when the portable electronic device 100 is in the time mode. For example, two, three, four, or more hands may be stacked on the minute hand and the stacked hands are spread apart to divide the display into two, three, or more segments when in the display mode.

Referring to FIG. 9, for example, four watch hands 902, 904, 906, 908 are aligned such that the watch hands are stacked together as the minute hand 206 shown in FIG. 2 when the portable electronic device 100 is in the time mode at 502. In response to receipt of the input to enter the display mode at 504, the hands are rotated at 506 to different locations such that the hands are spread apart and divide the touch-sensitive display 118 into four segments 910, 912, 914, 916. For the purpose of the present example, the four minute hands 902, 904, 906, 908 are directed to the 12:00, 3:00, 6:00, and 9:00 positions such that the segments are quadrants of the touch-sensitive display 118. The hour hand 208 is aligned with one of the minute hands 902, 904, 906, 908 such that the one of the minute hands is stacked on top of the hour hand 208. For the purpose of the present example, the input to enter the display mode at 504 comprises a signal received at the portable electronic device 100, from the handheld electronic communication device 800, when a media player application is launched on the handheld electronic communication device 800. When the portable electronic device 100 enters the display mode, each segment displays information relating to the media player application that is running on the handheld electronic communication device 800. The information includes selectable buttons. A selectable play button is displayed in the upper left segment 910, a selectable stop button in displayed in the upper right segment 912, a skip forward button is displayed in the lower right segment 914, and a skip backward button is displayed in the lower left segment 916.

A user may select one of the buttons or the segments to control the media player application on the handheld electronic communication device 800. For example, a touch on the play button in the upper left segment 910 may cause the media player application running on the handheld electronic communication device 800 to begin playing a song. Similarly, a touch on the stop button in the upper right segment 912 may stop the song playing on the handheld electronic communication device 800. A touch on the skip forward button in the lower right segment 914 or the skip backward button in the lower left segment 916 causes the portable electronic device 100 to communicate with the handheld electronic communication device 800 to control the media player running on handheld electronic communication device 800 to begin playing the next song or to a previous song, respectively.

In the examples shown and described herein, the watch hands are coupled to an analog watch mechanism through an aperture in the center of the touch-sensitive display. Alternatively, the watch hands may be coupled to concentric rings around a periphery of the display. Thus, the watch hands may be coupled to an analog watch mechanism by a coupling that is outside of the touch-sensitive display, rather than extending through the touch-sensitive display. For example, the watch hands may be coupled to rings disposed under or that extend around an outer periphery of the touch-sensitive display. Optionally, the watch hands may be moveable to a position in which the hands are rotated such that the hands do not cover any part of the touch-sensitive display or are hidden, for example, under a bezel of the portable electronic device when the portable electronic device is in the display mode.

The mechanical watch hands of the portable electronic device 100 facilitate use of the portable electronic device 100 as a watch and the touch-sensitive display 118 operates in a reduced power condition or is turned off during use of the portable electronic device 100 as a watch, thereby increasing the time between charging the battery. The display may be powered up or turned on to display information in a display mode. When the portable electronic device enters the display mode, the watch hands are moved to locations such that the time is not displayed on the portable electronic device and the hands do not obscure the information displayed on the touch-sensitive display. The hands may be utilized to divide the display into identifiable segments in which information is displayed.

The scope of the claims should not be limited by the preferred embodiments set forth in the examples, but should be given the broadest interpretation consistent with the description as a whole.

What is claimed is:

1. A method of controlling a first electronic device having a display, the method comprising:
   in a time mode, controlling analog watch hands disposed over the display to display a time on a watch dial that includes the display;
   in response to receipt of an input to enter a display mode:
      rotating the watch hands to new locations relative to the display such that display of the time utilizing the watch hands is discontinued and the display is segmented by the watch hands into at least two segments; and
      displaying first information in a first one of the at least two segments and displaying second information in a second one of the at least two segments on the display, wherein rotating the watch hands comprises rotating the hands to the new locations to avoid obscuring the information on the display;
      wherein the first information and the second information relate to different applications or different functions of an application.

2. The method according to claim 1, comprising returning to the time mode from the display mode.

3. The method according to claim 1, comprising returning to the time mode in response to receipt of an input to return to the time mode while in the display mode.

4. The method according to claim 1, comprising automatically returning to the time mode after a predetermined period of time.

5. The method according to claim 1, wherein the display is turned off such that information is not displayed when in the time mode.

6. The method according to claim 1, wherein the application or applications are executed by a processor of the electronic device.

7. The method according to claim 1, wherein the information displayed comprises information received from a second electronic device in communication via short-range communications with the first electronic device.

8. The method according to claim 7, wherein the input to enter the display mode comprises receipt of a communication from the second electronic device.

9. The method according to claim 1, wherein the watch hands include a plurality of hands including an hour hand, a minute hand, and at least a third hand that is stacked on one of the hour hand and the minute hand when the portable electronic device is in the time mode and the hands are spread apart when the portable electronic device is in the display mode for segmenting the display into three or more segments.

10. A non-transitory computer-readable storage medium having computer-readable code executable by at least one processor of the portable electronic device to perform the method according to claim 1.

11. A portable electronic device comprising:
   a watch dial including a display;
   analog watch hands disposed on a first side of the display; and
   an analog watch mechanism disposed on a second side of the display, which second side is opposite the first side, wherein the analog watch mechanism is coupled to the analog watch hands disposed on the first side of the display;
   a processor coupled to the analog watch mechanism and to the display to:
      in a time mode, control the analog watch hands to display a time on the watch dial;
      in response to receipt of an input to enter a display mode:
         rotate the watch hands to new locations relative to the display such that display of the time utilizing the watch hands is discontinued and the display is segmented into at least two segments; and
         display first information in a first one of the at least two segments and display second information in a second one of the at least two segments on the display,
         wherein rotating the watch hands comprises rotating the hands to the new locations to avoid obscuring the information on the display and wherein the first information and the second information relate to different applications or different functions of an application.

12. The portable electronic device according to claim 11, wherein the watch hands include a plurality of hands including an hour hand, a minute hand, and at least a third hand that is stacked on one of the hour hand and the minute hand when the portable electronic device is in the time mode and the hands are spread apart when the portable electronic device is in the display mode to segment the display into three or more segments.

13. The portable electronic device according to claim 11, wherein the display is turned off when the portable electronic device is in the time mode.

14. The portable electronic device according to claim 11, comprising short range communications coupled to the processor for communicating with a second portable electronic device.

15. The portable electronic device according to claim 14, wherein the input to enter the display mode comprises receipt of a communication from the second portable electronic device.

16. The portable electronic device according to claim 14, wherein the information displayed when in the display mode comprises information received from the second portable electronic device.

17. The portable electronic device according to claim 11, wherein the portable electronic device automatically returns to the time mode, from the display mode, after a predetermined period of time.

18. The portable electronic device according to claim 11, wherein the input to enter the display mode comprises a user-interaction input directly to the portable electronic device.

* * * * *